(12) United States Patent  (10) Patent No.: US 9,194,529 B2
Pajak et al.  (45) Date of Patent: Nov. 24, 2015

(54) METHOD AND APPARATUS FOR PROTECTING DRAINAGE PIPE INSTALLED UNDERGROUND

(71) Applicant: UPSCO, Inc., Moravia, NY (US)

(72) Inventors: Daniel E. Pajak, Skaneateles, NY (US); Andrew P. Boos, Skaneateles, NY (US); Christian D. Kane, New Paltz, NY (US)

(73) Assignee: UPSCO, Inc., Moravia, NY (US)

( * ) Notice: Subject to any disclaimer, the term of this patent is extended or adjusted under 35 U.S.C. 154(b) by 0 days.

(21) Appl. No.: 13/914,266

(22) Filed: Jun. 10, 2013

(65) Prior Publication Data

US 2013/0315675 A1  Nov. 28, 2013

Related U.S. Application Data

(63) Continuation-in-part of application No. 13/787,222, filed on Mar. 6, 2013.

(60) Provisional application No. 61/650,832, filed on May 23, 2012.

(51) Int. Cl.
*F16L 1/00* (2006.01)
*F16L 57/06* (2006.01)
*E02B 11/00* (2006.01)
*F16L 1/11* (2006.01)

(52) U.S. Cl.
CPC .............. *F16L 57/06* (2013.01); *E02B 11/005* (2013.01); *F16L 1/00* (2013.01); *F16L 1/11* (2013.01)

(58) Field of Classification Search
USPC .................. 405/157; 138/110; 285/45, 53, 55
See application file for complete search history.

(56) References Cited

U.S. PATENT DOCUMENTS

| | | | |
|---|---|---|---|
| 4,983,449 A | 1/1991 | Nee | |
| 5,099,889 A | 3/1992 | Ratzlaff | |
| 5,713,392 A | 2/1998 | O'Rourke | |
| 5,971,667 A * | 10/1999 | Graham | 405/184 |
| 5,988,227 A | 11/1999 | Magoffin | |
| 7,093,858 B1 * | 8/2006 | Russell | 285/28 |
| 7,308,911 B2 * | 12/2007 | Wilkinson | 138/104 |
| 7,367,748 B2 | 5/2008 | Groebner et al. | |
| 8,502,069 B2 * | 8/2013 | Holland et al. | 174/36 |
| 2007/0053749 A1 | 3/2007 | Jarvis et al. | |
| 2008/0302436 A1 | 12/2008 | Elowitz | |
| 2009/0214299 A1 | 8/2009 | Roussy | |
| 2013/0313825 A1 | 11/2013 | Pajak et al. | |

FOREIGN PATENT DOCUMENTS

CA  2517980 A1  4/2005
EP  0038974 A2  11/1981

OTHER PUBLICATIONS

ISA/US International Search Report and Written Opinion for Corresponding International Application No. PCT/US2013/042456 mailed Oct. 8, 2013 (9 pgs).

* cited by examiner

*Primary Examiner* — Tara M. Pinnock
(74) *Attorney, Agent, or Firm* — Harris Beach PLLC

(57) ABSTRACT

A pipe protection apparatus includes a sheet of permeable material having an inner surface and an outer surface and a longitudinal direction and a width direction defined by two edges of the sheet along the longitudinal direction. A fastening structure is configured to join the two edges to form a seam as the sheet of permeable material is wrapped in the width direction around a drain pipe configured to be installed underground to form a sock along the longitudinal direction. The sock is configured to be installed underground with the drain pipe about which it is wrapped, yet to remain for a service life in non-bonding contact with the pipe.

21 Claims, 6 Drawing Sheets

METHOD AND APPARATUS FOR PROTECTING DRAINAGE PIPE INSTALLED UNDERGROUND

CROSS-REFERENCE TO RELATED APPLICATIONS

This application claims priority to and the benefit of U.S. provisional patent application Ser. No. 61/650,832, METHOD AND APPARATUS FOR PROTECTING PIPE INSTALLED UNDERGROUND AFTER HORIZONTAL DRILLING, filed May 23, 2012, and co-pending U.S. patent application Ser. No. 13/787,222, METHOD AND APPARATUS FOR PROTECTING PIPE INSTALLED UNDERGROUND, filed Mar. 6, 2013, which applications are incorporated herein by reference in their entirety. This application is also related to U.S. patent application Ser. No. 13/787,359, COUPLER METHOD AND APPARATUS FOR INSTALLING PIPE WITH A PROTECTIVE COVER INTO BOREHOLE, filed Mar. 6, 2013, which application is incorporated herein by reference in its entirety.

FIELD OF THE INVENTION

The invention relates to a method and apparatus for protecting pipe installed underground and more particularly to drainage pipe installed in a borehole or existing host pipe or conduit.

BACKGROUND OF THE INVENTION

Directional drilling (also referred to in the art as "horizontal drilling" or "horizontal directional drilling") was invented in the 1920s and the technology was originally used in oil fields to increase oil production. In the 1990s, directional drilling technology was adapted for utility installations. Directional bores have been installed for pipelines carrying oil, natural gas, petrochemicals, water, sewage, and other products. Also, directionally drilled holes have been used to install conduits which carry electric and fiber optic cables. Such continuous pipes, conduits, casings and the like are referred to hereinafter generally as "pipe".

Besides crossing under highways, railroads, airport runways, shore approaches, traffic islands, and areas congested with buildings, directionally drilled installations have been made under rivers and waterways, pipeline corridors, and protected wetlands. Directional borings have the least environmental impact of any alternate construction method. Directional drilling technology also allows placement of pipe under obstacles, provides maximum protection for the installation, and minimizes maintenance costs. During installation, normal business operations are usually not interrupted. Directional borings also have a predictable and short construction schedule.

Typically, after a directional boring pass is complete, a permanent pipe (e.g. a gas pipe, conduit, or casing of some sort) is pulled or pushed through the boring also known as a borehole. In the prior art, the pipe, which may be formed of, for example, metal or plastic, is not necessarily provided with exterior chafe protection prior to being inserted into the boring and thus, the pipe and any pipe coatings are vulnerable to damage from contact with protruding rocks and the like.

Many utility distribution piping systems are buried underground throughout the world. Older piping systems were often formed of cast iron or bare steel pipe. Newer systems may include coated steel or polyethylene. Older systems may also tend to be in urban or congested areas under asphalt or concrete paving that would render the replacing or rehabilitating such pipes expensive and disruptive to surface activities. Sliplining or host pipe insertion has also been used as a method for rehabilitation of existing pipelines to repair leaks or restore structural stability. Sliplining is completed by installing a smaller, "carrier pipe" into a larger "host pipe." The carrier pipe may be continuous along an entire run of pipeline or consist of multiple segments of pipe that are joined or fused end to end. Common material used to slipline an existing pipe include high density polyethylene (HDPE), fiberglass reinforced pipe and poly vinyl chloride (PVC). A host pipe may include debris, slag, burrs or sharp internal edges between pipe segments, as well as internal projections or coupons at service connection fittings that may damage or score the external surface of the carrier pipe as it is inserted within the host pipe.

As described in CA Patent No. 2517980C, hoses have been used as protective sleeves for borehole pipe installation. However, such relatively flexible materials, such as fire hoses, polyester materials, and other relatively loose weave materials, are water absorbent and can be difficult to install once water logged. Also, post-installation ingress of water and other ground contaminants such as petrochemicals cause pipe corrosion and/or degradation and in some cases premature pipe failure. Hoses can also be difficult and time consuming to pull over pipes being prepared into pipe-hose assemblies for installation into the borehole. Post-installation, such hoses can be subject to undesirable permanent bonding between the pipe, the hose, and the surrounding soil matrix.

Another problem involves the installation of drainage systems that typically utilize perforated pipe having relatively fragile structural integrity. Many drain pipes have relatively thin walls or porous wall structures which can be easily damaged during installation. At least in part because some drain pipes are relatively fragile and/or susceptible to debris entering drain holes during installation, it is common for drain pipes to be installed using open trench techniques. Where drain pipe is pulled or pushed into an existing hole, such as a borehole, debris such as earth and small rocks can be forced into openings of the drain pipe. One technique of the prior art allows drain pipes to be installed into boreholes using a multi-step procedure. The drain pipe is temporarily encased within a more robust outer pipe made from, for example, lengths of high density polyethylene (HDPE) pipe. The drain pipe is protected during installation by the HDPE pipe. The HDPE—drain pipe assembly is first pulled into the borehole, and then the protective HDPE pipe is pulled out from the borehole, while the installed drain pipe is kept in place, for example, by use of a cord system.

SUMMARY OF THE INVENTION

There is a need for a more cost efficient and simpler method and apparatus for installing drain pipe.

According to one aspect, the invention features a drain pipe protection apparatus which includes a sheet of permeable material having an inner surface and an outer surface and a longitudinal direction and a width direction defined by two edges of the sheet along the longitudinal direction. A fastening structure is configured to join the two edges to form a seam as the sheet of permeable material is wrapped in the width direction around a drain pipe configured to be installed underground to form a sock along the longitudinal direction. The sock is configured to be installed underground with the drain pipe about which it is wrapped.

In one embodiment, the drain pipe is configured to be installed into a borehole formed by a method selected from the group consisting of directional drilling, auger boring, pipe ramming, static plowing, and combinations thereof.

In another embodiment, the pipe protection apparatus is configured to be inserted into a host drain pipe.

In yet another embodiment, the sheet of permeable material includes a long chain polyethylene.

In yet another embodiment, the sheet of permeable material includes an ultra-high density polyethylene.

In yet another embodiment, the sheet of permeable material includes an aramid.

In yet another embodiment, the sheet of permeable material includes a liquid crystal polymer.

In yet another embodiment, the sheet of permeable material includes a combination of one or more materials selected from the group consisting of a long chain polyethylene, an ultra-high density polyethylene, an aramid, and a liquid crystal polymer.

In yet another embodiment, the sheet of permeable material includes a woven polypropylene loaded with carbon.

In yet another embodiment, the fastening structure includes a hook-and-loop fastener.

In yet another embodiment, the fastening structure includes a zipper.

In yet another embodiment, the permeable material includes a high strength yarn.

In yet another embodiment, the permeable material includes a yarn formed from fibers having a tensile modulus equal to or greater than 150 grams/denier.

In yet another embodiment, the pipe protection apparatus further includes a tracer wire.

In yet another embodiment, the tracer wire is disposed within the fastener structure.

According to another aspect, the invention features a method for protecting a drain pipe before, during and after installation, including the steps of: providing a sheet of permeable sock fabric; installing the sheet of permeable sock fabric around the pipe by the steps of: placing the sheet of permeable sock fabric adjacent the drain pipe; wrapping the sheet of permeable sock fabric around the drain pipe; securing the sheet to itself along a seam to form a permeable sock-covered drain pipe; and installing the permeable sock-covered drain pipe underground.

In one embodiment, the step of installing the permeable sock-covered pipe underground further includes inserting the permeable sock-covered pipe into a borehole.

In another embodiment, the borehole is formed by a method selected from the group consisting of directional drilling, auger boring, pipe ramming, static plowing, and combinations thereof.

In yet another embodiment, the step of installing the permeable sock-covered drain pipe underground further includes inserting the permeable sock-covered drain pipe into a host drain pipe.

In yet another embodiment, the step of providing a sheet of permeable sock fabric includes providing a roll of sheet of permeable sock fabric.

In yet another embodiment, the step of providing a sheet of permeable sock fabric includes providing a sheet of permeable sock fabric including a material selected from the group consisting of a long chain polyethylene, an ultra-high density polyethylene, an aramid, a liquid crystal polymer, and combinations thereof.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
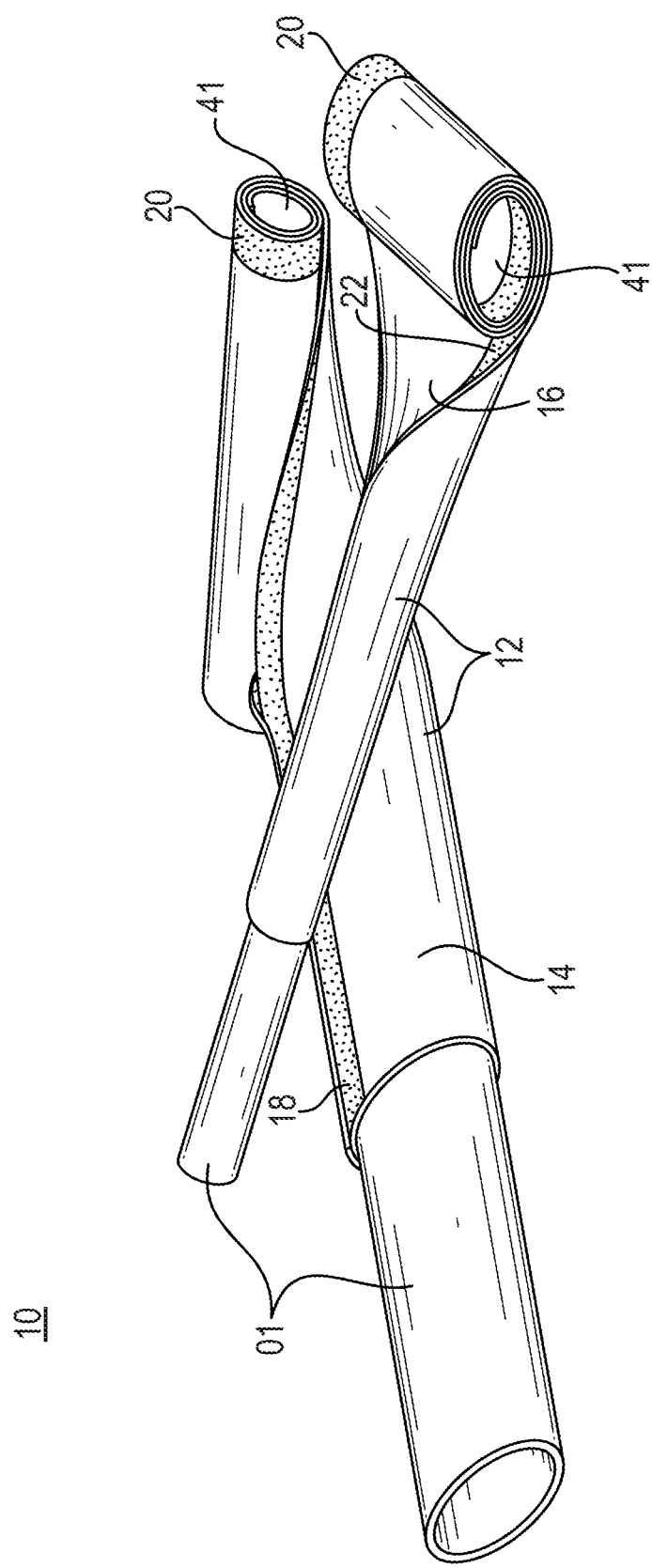
FIG. 1 shows an illustration of two exemplary short cut-off sections of pipes which are partially covered by a protective sock.

As described hereinabove, protection methods of the prior art for pipe insertion into boreholes and host pipes have a number of problems. Although directional drilling for a pipe installation can be useful and advantageous in many applications, directional drilling suffers from drawbacks. For example pipes installed following directional drilling can be exposed to lateral hazards such as projecting rocks as well as subjected to longitudinal scraping, chafing of the pipe exterior against projecting rocks due to thermal cycles, or subterranean erosion during the working life of the installation. Scratching or chafing can damage or partially remove protective coatings on the exterior of the pipe. In severe cases, the structural integrity of the pipe wall can be compromised. In worst case scenarios, such as, for example, polyethylene, fusible PVC, or similar type pipes carrying natural gas, the consequence of catastrophic pipe failure can include loss of life and property.

Host pipe insertion suffers from similar problems. For example carrier pipes installed within an existing host pipe can be exposed to lateral hazards such as burrs or sharp edges from host pipe joints, slag, debris or projections from existing or discontinued service connections that may cause longitudinal scraping, chafing of the exterior of the carrier pipe. Scratching or chafing can damage or partially remove protective coatings on the exterior of the pipe or compromise the structural integrity of the carrier pipe.

In an attempt to mitigate such drawbacks, protective sheathes have been used in the prior art. Such sheathes have been manufactured as continuous hoses. Therefore, prior art techniques typically require hoses made from a somewhat flexible material, so that the hoses can then be pulled over a pipe to be installed into a borehole. Stronger materials, which in many cases are substantially inflexible, are not suitable for use with the prior art methods. It can be very difficult, if not impossible, to insert a pipe to be protected into an already formed hose structure made of such inflexible materials. Also, it may not be possible or practical to pre-form some relatively inflexible high-strength materials into a pre-made hose.

Another problem with prior art hoses is that the hoses are typically made of materials which absorb water. Water is either absorbed directly into a covering fabric and/or into the spaces of the fabric weave, especially in the case of polyester fabrics. Most underground boreholes are drilled using drilling slurry, some of which remains in the borehole, and ground water and/or run-off water typically enters borehole during and after drilling. One problem with slurry and/or water absorption by a pipe protective cover is a significant increase in weight of the pipe/protection layer assembly. As more force is needed to pull such a water/liquid logged assembly and more mass is being pulled along sharp rocks along a borehole, damage can occur both to the pulling equipment as well as to the pipe assembly. Another problem with the water absorption of the prior art methods is that ground water is typically contaminated by either man made contaminants and/or naturally occurring substances such as petrochemical pollution products and naturally found petrochemicals. After installation of a prior art hose, there can be a continuous wicking of harmful contaminants directly to the outside surface of the underground pipe. Over long periods of time, such contaminants can cause a relatively rapid corrosion of metal pipes and plastic/polyethylene pipes can deteriorate and weaken. In the continuous presence of contaminants, a portion of a plastic/poly pipe can ultimately soften or dissolve creating a fluid or gas breach in a section of an underground pipe. As such, a protective pipe-hose assembly made with a liquid absorbent and/or permeable hose material of the prior art can actually suffer a reduction in the service life.

Turning now to the inventive method and apparatus, a solution to the water and/or contaminant problems associated with the installation of protected pipes into boreholes or existing host pipes uses one or more layers of a medium to high strength materials such as, for example, a long chain a polyethylene, an ultra-high density polyethylene, aramids, liquid crystal polymers, and suitable combinations thereof. Such materials can be made substantially impermeable to water as well as other typical underground contaminants. However, as described hereinabove, some of these materials are generally less suitable for manufacture into pre-formed hoses, such as were used in the prior art. Also, even where such materials can be made into continuous hoses or tubes, pre-formed hoses or tubes would be difficult if not impossible to install over lengths of pipe because one or more layers of sheets made from these materials are substantially inflexible.

FIG. 1 shows two exemplary short cut-off sections of protected pipes which are partially covered by a protective material to illustrate an exemplary embodiment of a protective cover (referred to hereinbelow as a "sock"). Sock 12, a pipe protection apparatus, includes a sleeve having an outer surface 14 and an inner surface 16. Sock 12 is formed from a length of material (e.g. a woven fabric) having a width in a width direction perpendicular to a longer longitudinal, length direction. The sheet of material (e.g. a sheet of sock fabric) can be conveniently provided as a roll 41 (e.g. roll of sheet of sock fabric). A sock fabric of any suitable width dimension can also be provided on a bobbin, such as, for example, an industrial bobbin, or on any other suitable form. Also, a relatively light weight sock fabric can be carried to an installation site as a loose roll or in any suitable fold (e.g. an accordion fold).

Installation of a sock onto a pipe: During installation of sock 12 onto pipe 01, the length of material can be manually or machine rolled in its short direction (i.e. the width dimension, perpendicular to the longitudinal direction) to substantially wrap around to conform in a non-bonding way to the diameter of the pipe to be protected. A seam 18 is closed as the sock is formed in the longitudinal direction. Typically, sock 12 can be conveniently manually formed by hand. However, in some installations, there could also be an automated, semi-automated, or tool assisted installation of a sock onto a pipe by machine. In many installations, roll 41 can provide enough material for a single continuous sock. However, there can also be multiple joined socks 12 along the length of a pipe.

Sock 12 is not permanently bonded to the pipe 01. Thus, after assembly and installation, at least in part because of the low coefficient of friction of the sock material, sock 12 advantageously remains in sliding engagement with pipe 01. As described in more detail hereinbelow, such loose construction allows for mechanical slippage between the pipe and sock 12 (e.g. to allow for such factors as expansion and contraction of the pipe and any attached pipe fittings). Sliding engagement between pipe 01 and sock 12 also helps to prevent the assembly of sock 12 and pipe 01 from aging into a single bonded structure. In some installations, again because the low coefficient of friction of sock 12, there can also be permanent non-bonded contact between the sock and the surrounding soil matrix.

Sock seams: Seam 18 can be formed using any suitable fastening structure. In the exemplary installation of FIG. 1, seam 18 is formed from a hook-and-loop closure system including strips of hook 20 and strips of loop 22 fastener strips. In most embodiments, the location of the hooks and loops on the respective sheet edges is unimportant and can be reversed. The strips of hook 20 and strips of loop 22 fastener strips are affixed by any suitable method, such as by sewing with industrial methods know in the art, to the respective opposed two edges of the sheet of fabric which forms sock 12. Such fastening strips are commercially available and widely known, for example, under the trade names VELCRO™ and VEL-LOC™. While the embodiment of FIG. 1 as described hereinabove used a hook-and-loop fastening technology, any suitable fastener technology can be used in place of the hook 20 and loop 22 fastener strips to form the seam 18. Alternative fasteners may include interlocking edge fasteners, interlocking tabs, sliding edge fasteners, zippers, straps, buckles and snaps. Other methods of fastening may include pressure sensitive adhesives, heat activated adhesives, solvent activated adhesives, and tapes utilizing such adhesives.

Typically, a sock 12 is provided as one continuous rolled sheet (e.g. roll 41 of material, FIG. 1). However, where more than one length of sock 12 is used, once sock 12 has been fitted over pipe 01, the ends of sock 12 are connected to adjacent socks if sock 12 is being applied in discrete lengths.

Sliding engagement: As discussed hereinabove, unlike many prior art protective pipe wrappings, while the present sock can fit snugly about the pipe, sock 12 is not permanently bonded to the pipe and thus can accommodate longitudinal shifting of the pipe within the borehole. Such sliding engagement helps to prevent scuffing of the pipe against the borehole sidewalls. According the inventive method, a sock 12 is installed onto a pipe 01 without being permanently attached thereto. With such freedom of pipe movement, cohesive bonding between the surrounding soil matrix (earth) and the pipe can be substantially eliminated. That is, sock 12 can remain slidingly engaged (non-bonded to the earth) within sock 12 for the useful borehole installed service life of the pipe.

Installation of the pipe-sock assembly: The pipe of a pipe-sock assembly can be attached to any suitable apparatus for emplacing the pipe and sock into a previously drilled hole. The apparatus typically inserts the pipe and sock into the borehole or existing host pipe together. When the pipe is properly positioned within the hole, the apparatus can then be disconnected from the pipe and the sock leaving the installed pipe covered by sock 12 in the hole and ready for service.

Figure 2:
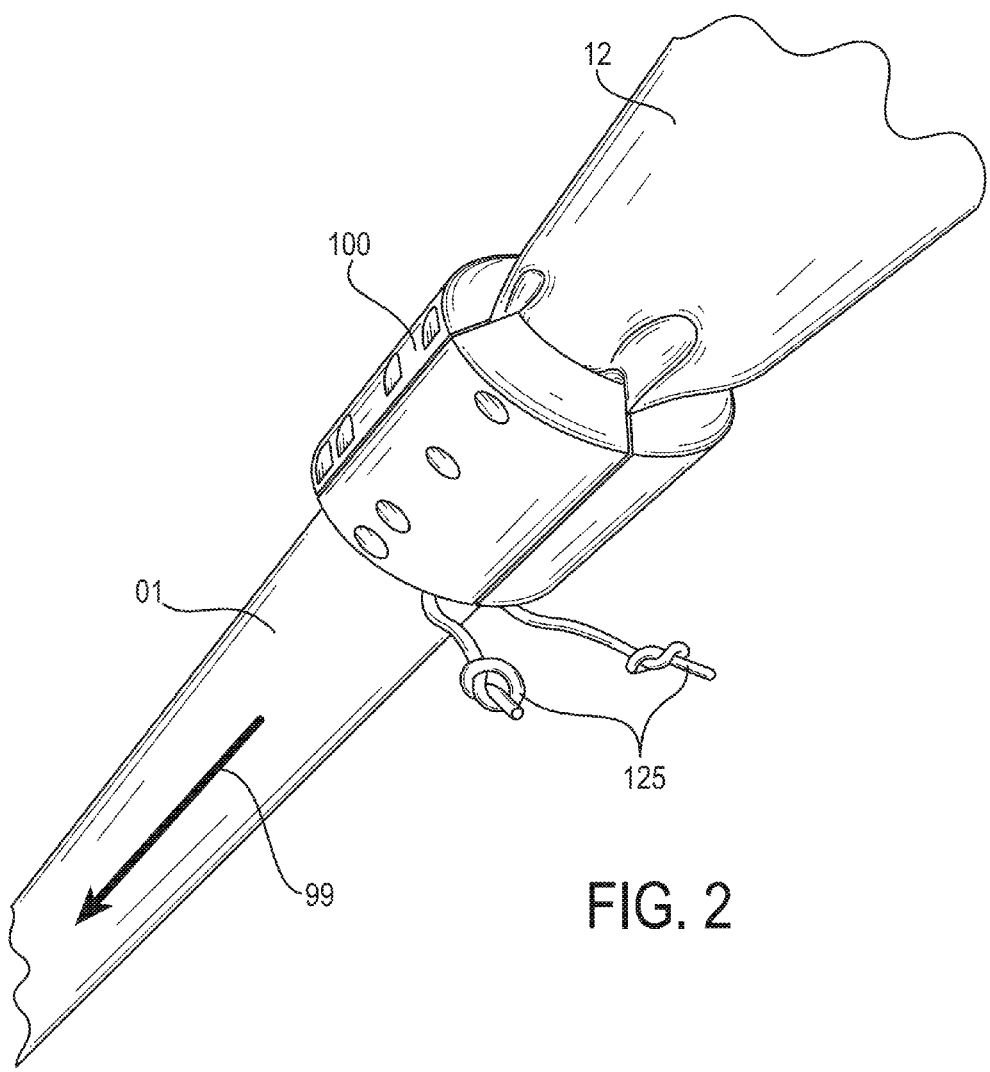
FIG. 2 shows an illustration of one exemplary installation of a sock and pipe assembly into a borehole.

FIG. 2 shows an illustration of one exemplary installation of a sock 12 into a borehole (lower left, not shown). Arrow 99 represents the direction of travel of pipe 01 and sock 12 into the borehole. Coupler 100 holds sock 12 to pipe 01 as the assembly of sock 12 and pipe 01 is pulled into the borehole.

Typically, the apparatus to install the pipe-sock assembly (e.g. a pull-head) is affixed to pipe 01 and not to the coupler 100, which is located a distance from the end of the pipe 01. A suitable such coupler and a method of installation are described in co-pending U.S. patent application Ser. No. 13/787,359, COUPLER METHOD AND APPARATUS FOR INSTALLING PIPE WITH SOCK INTO BOREHOLE, which application is incorporated herein by reference in its entirety for all purposes. Also visible are tracer wires 125, electrical conductors used post-installation for remote sensing of the location of the underground pipe. Seam 18 (FIG. 1) is not visible in FIG. 2. Any suitable apparatus (e.g. an apparatus including a pipe pull head) as known to those skilled in the art can be used to insert pipe 01 and a sock 12 into a borehole. In the exemplary installation of FIG. 2, coupler 100 is mechanically coupled by frictional forces to both pipe 01 and to sock 12. In this embodiment, coupler 100 rides into the borehole along with pipe 01, however the installation apparatus is not directly connected to either coupler 100 or sock 12. Once installed in-place in the borehole, re-usable coupler 100 is typically removed from the pipe-sock assembly.

Figure 3:
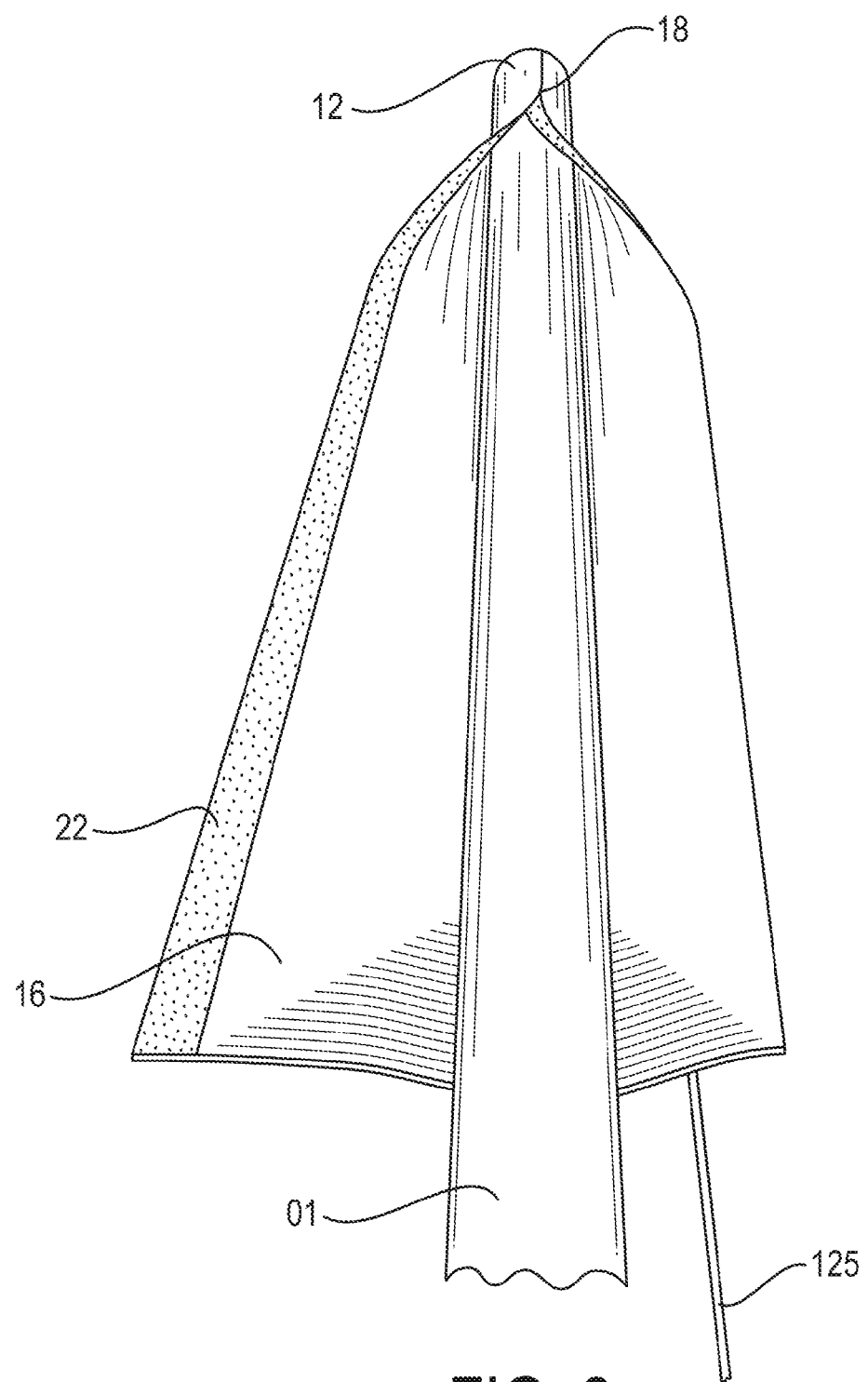
FIG. 3 shows an illustration of the installation of the sock-covered pipe of FIG. 2.

FIG. 3 shows another illustration of the exemplary installation of a sock-covered pipe into a borehole of FIG. 2. Sock 12 is being formed (center top) by closing a VELCRO™ strip (loops 22 and hooks 20) to form seam 18 about pipe 01. In the foreground (lower center) the pipe can be seen as placed on the inner surface 16 of the sock fabric which is to become sock 12. A tracer wire 125 can also be seen in the foreground.

Figure 4:
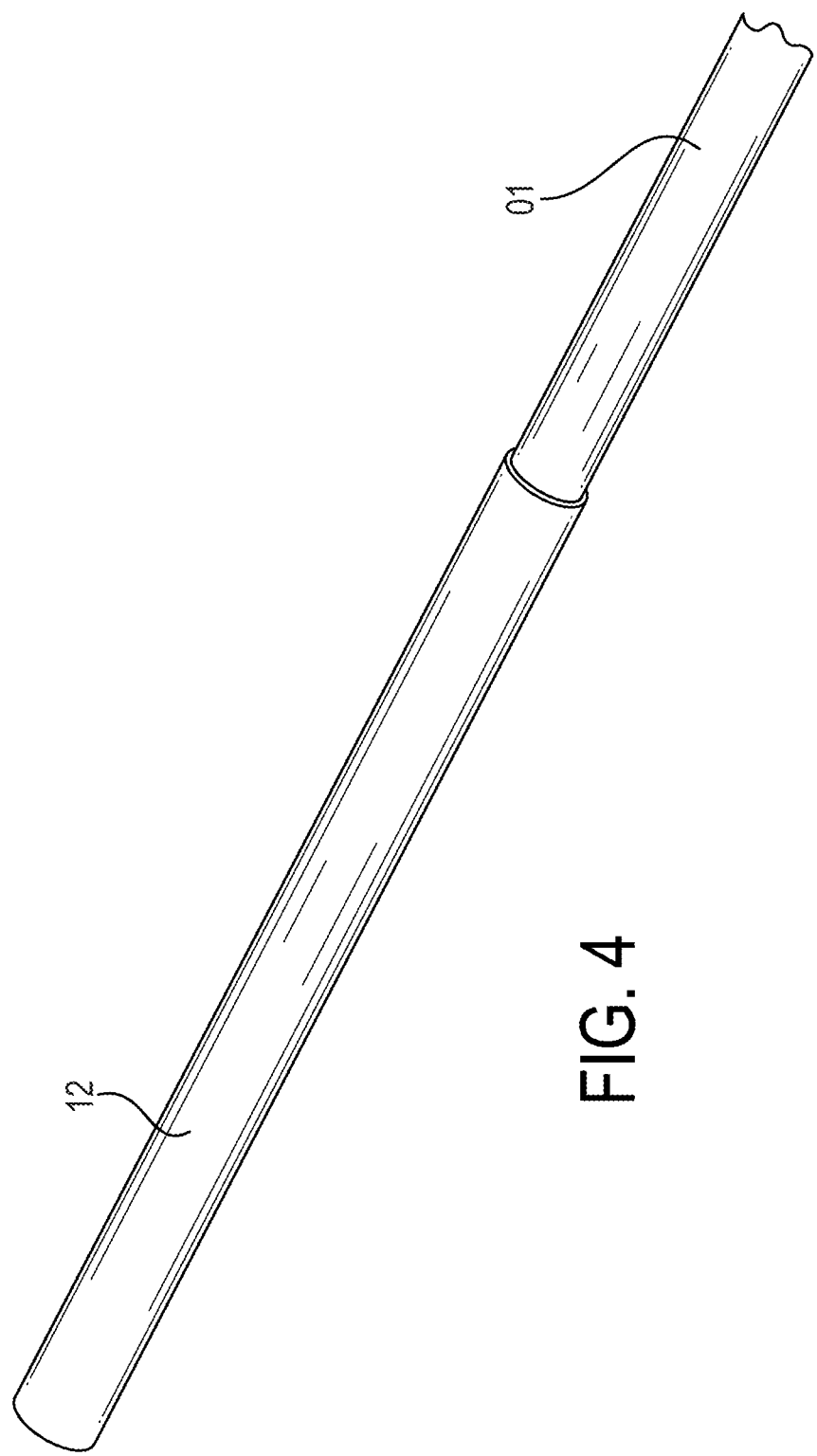
FIG. 4 shows another illustration of an exemplary sock-pipe assembly installation.

FIG. 4 shows illustration of an exemplary installation of a sock 12 into a borehole. In the illustration of FIG. 4, sock 12 has already been fitted about a pipe 01 and the seam 18 (not visible in FIG. 4) has been formed and closed. The length of sock 12 is sufficient to cover the portion of pipe 01 that will remain in the borehole after insertion by any suitable insertion means.

Figure 5:
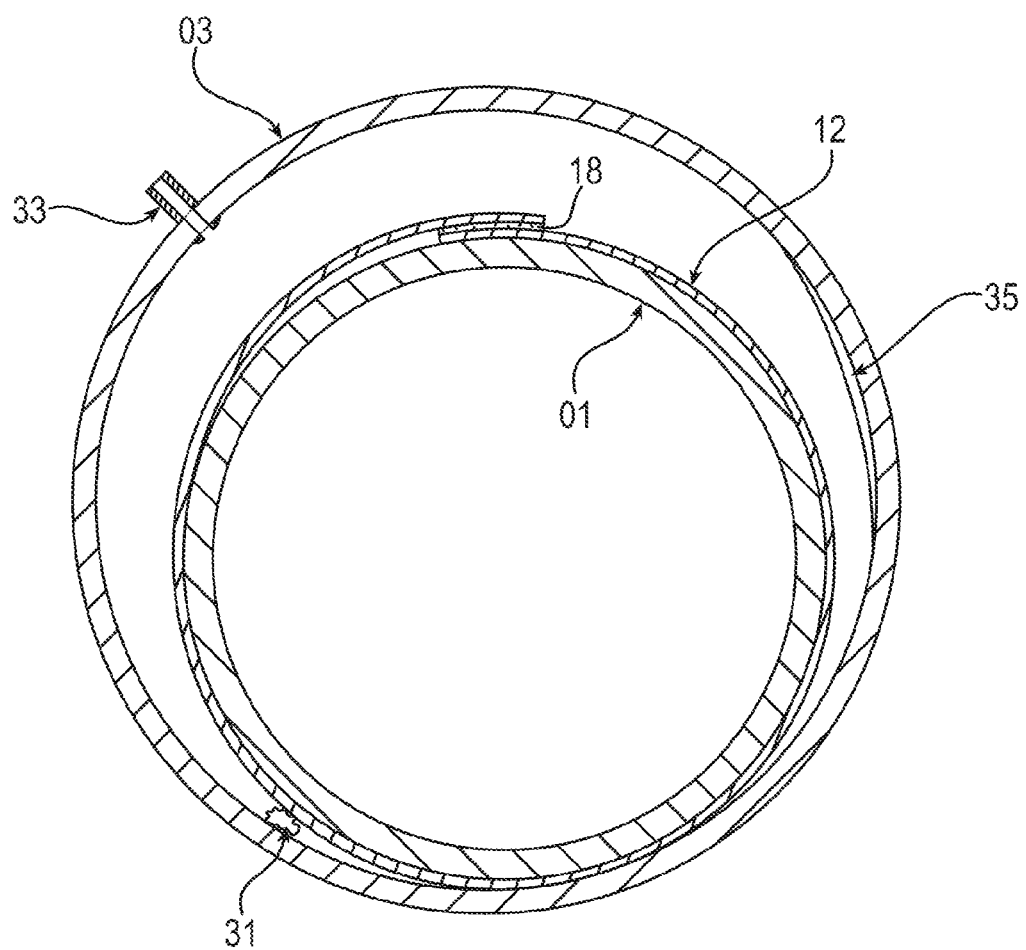
FIG. 5 shows a cross-section of another exemplary installation of a protective sock around a carrier pipe within a host pipe.

FIG. 5 shows a cross-section of another aspect of the invention wherein a protective sock 12 has been fitted about a carrier pipe 01 which together have been installed within a host pipe 03. The protective sock protects the carrier pipe before during and after host pipe insertion from lateral scraping and damage caused by debris 31, lateral service connections 33 and burrs or sharp interior edges 35 at pipe joints or damaged walls of the host pipe.

Sock materials: A fabric suitable for use to form the abrasion-resistant and cut-resistant protective cover sock can be woven from high-strength yarns. As used herein, "high strength yarns" include, but are not limited to, yarns formed from fibers having a nominal modulus equal to or greater than 900 grams/denier and a tenacity equal to or greater than 30 grams/denier. The yarns used to form a woven sheet can be formed from long chain polyethylene fibers available from suppliers. For example, in one embodiment, UHMW-PE woven fabric sold under the trade name Supreme Protector™ 509WE (available from JHRG Manufacturing LLC of Spring Hope, N.C.) can be used to manufacture a sock 12. Such materials can be provided with a thickness of about 0.020 inches (0.508 mm) and a weight of about 12.5 ounce/yard (385 grams/meter). The 509WE material has a tensile strength of about 30.5 grams/denier, a modulus of about 920 g/denier and a Tabor abrasion resistance of about 63,000 cycles. As described hereinabove, other suitable yarns can be formed from an ultrahigh molecular weight polyethylene, aramids, or liquid crystal polymers or combinations thereof. Fabric so formed, typically from a fiber with a nominal tensile strength of more than about 10 gram/denier, has a high level of tear-resistance, abrasion-resistance, cut-and-puncture resistance, a low coefficient of friction, resistance to low temperatures, and resistance to chemicals. For the harshest borehole environments, sock 12 can have one or more additional layers and/or coatings. Additional layers can be made from the same materials, other materials, or any other suitable fabric, or additional protective coating.

Materials which are slightly less robust than Supreme Protector™ 509WE are also believed to be suitable for use in harsh environments, such as a material having the following material characteristics: yarns formed from fibers having a tensile modulus equal to or greater than 150 grams/denier and a tenacity equal to or greater than 7 grams/denier, a tensile strength of 25.2 g/denier, a modulus of 785 g/denier.

In one exemplary embodiment, a 0.02" thick sock weighs 11.5 ounces/yard and having a 1,100 pound/square inch break strength (15 times stronger than steel), that operates normally in an ambient temperature range of −40° F. to 250° F. (i.e. for usability in the environment prior to and during installation), is chemical resistant and provides resistance to UV radiation. UV radiation damage resistance can provide a longer shelf life prior to installation, particularly where sock materials are exposed to direct or indirect sunlight prior to installation.

In some less demanding applications, it is contemplated that a relatively low cost sock can be manufactured from medium to high strength yarns, such as for example, a woven polypropylene loaded with carbon with a high tensile strength and UV resistant. For example, some Mauritzon Trampoline Fabrics are contemplated as suitable materials for manufacturing a sock 12 (available from Mauritzon, Inc. of Chicago, Ill.). Another fabric that is contemplated as suitable for manufacturing a slightly lighter duty a sock 12 is the TenCate Permatron® Trampoline Fabric (available from TenCate Geosynthetics of Pendergrass, Ga.).

Sock Fasteners: Any suitable industrial or high strength fastening system can be used to form the sock seam, such as the seam 18 of FIG. 1. In one exemplary embodiment, Velcro™ fastener strips can be attached to the inner surface 16 and the outer surface 14 of a sock 12. For example, Velcro™ fastener strips can be attached to a sock by sewing machine with a medium to high strength thread using industrial sewing methods as known in the art. Any other suitable hook and eye type fastening strips can be used as loops 22 and hooks 20 to form the seam of a sock formed about a pipe. As discussed hereinabove, where loops and hook are used, the order of loops 22 and hooks 20 is unimportant to either edge of the sock fabric and can be reversed. Recent innovations known as military grade hook and eye fasteners are also contemplated to be particularly suitable for such use.

The width of either or both fastening strips can be substantially the same, however more commonly the width of at least one strip can be made wider than the other to allow for some adjustment of the diameter of the installed sock. For example, referring back to FIG. 1, in some embodiments, the width of the strip of loops 22 can be made wider than the width of the strip of hooks 20. Also, where one or more rolls having a width more narrow than a desired width are available, it is contemplated that a larger diameter sock could be made in the field by assembling two or more rolls 41 together widthwise, resulting in a completed sock having more than one seam 18.

Seam 18, typically formed in the field prior to or during installation of a pipe-sock assembly into the borehole, is not limited to hook and eye fasteners and can be accomplished using any suitable method to join the two longitudinal edges of the material. For example, it is contemplated that some industrial zippers can be used to create a seam 18. Depending on the fastener technology, the fastener strips can be of any suitable type fastener which otherwise positively engages and locks the two strips together. It is also contemplated that there could be suitable fast curing glues or adhesives which may also be suitable for field installation of a seam 18. In the case of a fast curing glue or adhesive, in some embodiments, the glue or adhesive may be directly applied in strips or stripes along the edges of the inner surface 16 and outer surface 14 without need for strips of additional material.

Water-tight seams: In some applications, seam 18 can be made substantially water-tight to prevent liquids from seeping from the outside soil matrix surrounding an installed sock 12, in towards the inner surface 16 of sock 12. In the most demanding applications, it is contemplated that a seal can be added at or near seam 18. For example, a gasket can be formed from one or two piece strips disposed on or near a loops 22 fastener strip. Any suitable sealing method can be used. Suitable gaskets include simple rubber strips, tongue and groove structures which positively engage during the formation of a seam 18, as well as additional water-resistant or water-proofing layers which can cover part of, or the entire inner surface 16 of a sock 12.

Tracer Wires: When installing a non-metallic pipe, such as for example, the yellow polyethylene pipe typically used in gas distribution systems, generally a tracer wire 125, FIG. 2, FIG. 3, is installed alongside pipe 01. Then, post-installation, the location of the underground pipe can be conveniently found using electronic remote sensing techniques well known in the art. It is contemplated that a tracer wire 125 can be further protected by installation between a pipe 01 and a sock 12 (i.e. within the sock). A tracer wire 125 can also be placed under either fastening strip before the fastener strip is attached (e.g. sewed) to the material of the sock. In such cases, tracer wire 125 can arrive at an installation site as an integral part of the roll 41, already assembled into the sock. Alternately, a tracer wire 125 can be provided as protected by its own strip affixed to the inner or outer surface of sock 12. In an alternative embodiment, where the fastener is comprised of conductive material, such as a metallic zipper or conductive thread or wire within the backing of the hook and loop fastener, the fastener itself may be sufficient to perform the function of acting as a tracer wire.

Cathodic protection: While in some applications as described hereinabove, a sock 12 can be made to be more water-tight or even substantially water-proof, in other applications, some intentional post-seepage of water can be advantageous. For example, some metallic pipe installations (e.g. some iron and steel pipe installations) can be treated by an electrical cathodic process to inhibit corrosion. Such techniques are well known in the art and analogous to similar electrical anti-corrosion techniques used to protect metallic vessel hulls in naval architecture. Where a cathodic anti-corrosion process is planned for metallic pipe installation into boreholes, it can still be desirable for many of the aforementioned reasons, such as protection from rock edges, to add a protective sock. However, for the cathodic anti-corrosion technique to operate as planned, there generally needs to be some water ingress towards the outer surface of the pipe to form a useable electrical circuit. In such cases, sock 12 can intentionally be made somewhat water permeable by providing small openings such as small holes to allow ground water to pass from outer surface 14 to inner surface 16 post-installation. Any suitable sized opening holes can be used. Typically such holes can be relatively small, such as, for example, an array of pin-hole sized holes, so that sock 12 does not catch or hang on any physical obstructions or sharp or jagged edges in the soil matrix during installation into the borehole.

Drain Pipe Installation

Installation of drain pipes is problematic. Drain pipes, such as for example, drain pipes used in French drain systems, can be somewhat fragile due to relatively thin walls and/or the perforations in the pipe walls which serve as drain holes. Also, some specialized drain pipe systems can have multiple layers of drain pipe structure, some parts more fragile than others. Even where installation related drain pipe damage is less of a problem, it can be difficult to keep foreign matter out of the drain holes before, during, and after installation.

Drain pipes are traditionally installed by open trench digging at least in part because setting the relatively fragile pipes into an open trench helps to minimize installation damage to the drain pipe. However, trench digging is expensive and can be disruptive to normal activities near where the drain pipe is being installed.

A more recent prior art system to install drain pipe into a borehole uses a multi-step approach. As described hereinabove, the fragile drain pipe is encased in a more robust pipe such as a HDPE pipe. The drain pipe is then protected during installation by the HDPE pipe. The HDPE—drain pipe assembly is pulled into the borehole, and finally the protective HDPE pipe is pulled out of the borehole while the fragile pipe is kept in place as installed in the borehole, for example, by a cord system. This multi-step approach is time consuming, expensive, and relatively inefficient.

However, constructing underground drains by techniques such as horizontal directional drilling (HDD) can be particularly advantageous, such as, for example, in the environmental remediation industry. Such drain systems are commonly installed to help remediate contamination of the earth such as, for example, contamination by petro chemicals, fuel spills, coal ash, landfill run off and the like. Use of HDD and/or similar suitable installation methods to build such drain systems eliminates the need for open trenching which would otherwise disturb, expose and potentially release such toxins from an area of which they are currently contained (underground) and therefore pose less threat of human exposure.

The HDPE temporary outer protective outer casing solution described hereinabove is believed to be particularly unsuitable in contamination situations because the final step of removing the temporary protective HDPE pipe would unnecessarily extract contaminants along with the HDPE protective pipe from the borehole. In a worst case situation, the contaminated HDPE pipe itself, might need to be cleaned using special cleaning techniques and/or disposed of as hazardous waste.

It was realized that similar base materials and techniques as previously described hereinabove as impenetrable or very slightly penetrable (e.g. for cathodic treatment applications) sock, can also be made and used in a new way to solve the problem of installing drain pipe underground, such as into boreholes. In a first embodiment, the fabric of the sock as described hereinabove is provided with a porous weave. The porous weave is opposite to the sock previously described herein above, where it was generally desirable to provide an impenetrable sock material. Such intentionally penetrable fabrics, for example, would not be coated by a water proofing polyethylene coating. Where yet higher fluid drain rates are needed, the sock fabric can be further intentionally perforated to cause openings to allow relatively high fluid flow rates.

Figure 6:
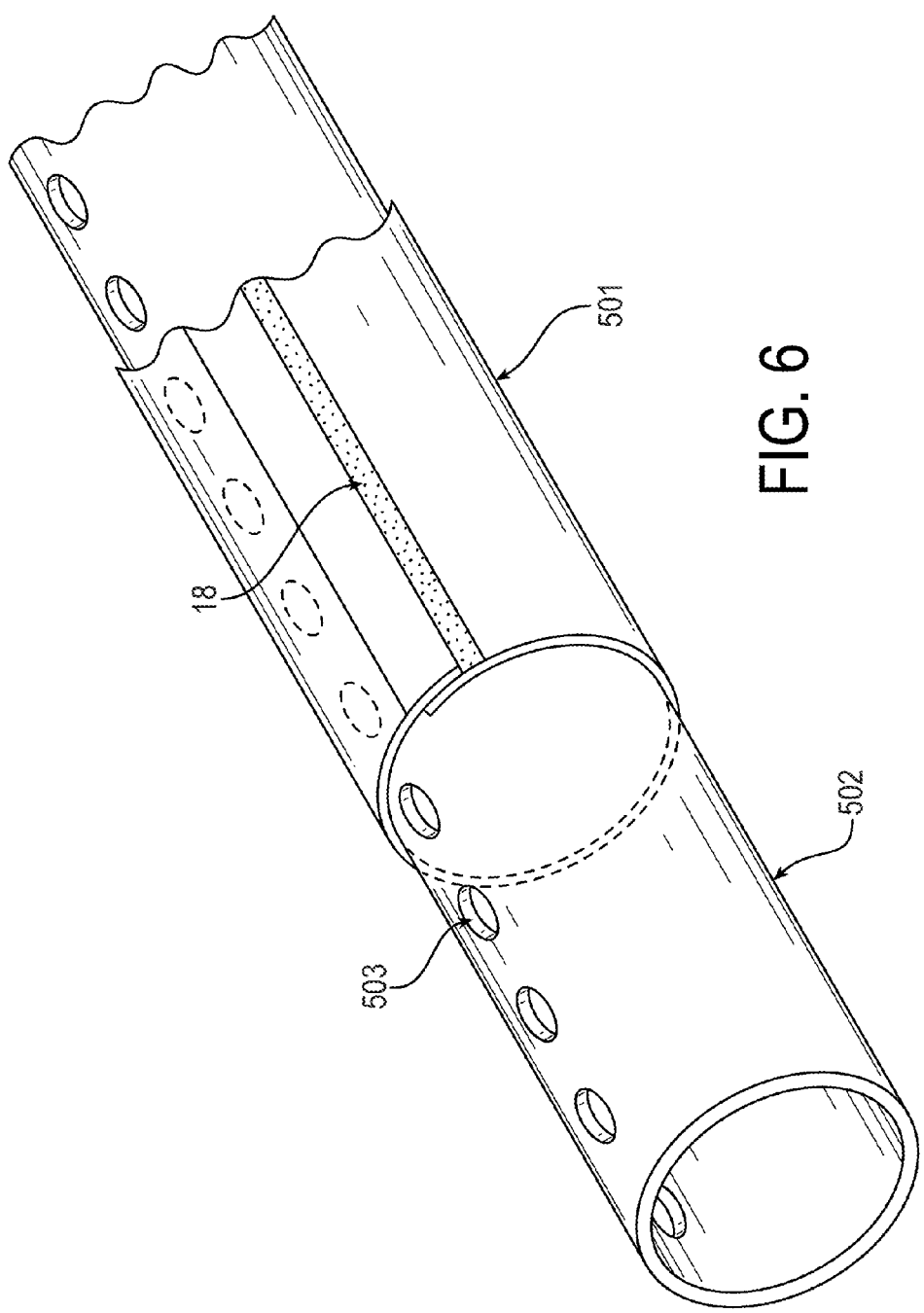
FIG. 6 shows an illustration of an exemplary fluid permeable sock covering a drain pipe.

FIG. 6 shows an illustration of one exemplary fluid permeable sock 501 covering a drain pipe 502 which can be made from any pipe suitable for borehole insertion, such as for example, HDPE or MDPE pipe. The porosity rate of the fluid permeable sock 501 can be adjusted for particular drainage applications. The pipe suitable for borehole insertion can be used as drain pipe by providing a plurality of openings, such as openings or holes in the pipe (e.g. perforations 503). Perforations, such as perforations 503 can be either pre-made or created in the field optionally using custom sizes and/or shapes suitable for a particular drainage application. Any suitable opening or hole shape, size, and spacing between openings and/or holes can be used. Any suitable manufacturing apparatus and/or manufacturing technique can be used to make the holes and/or openings in the pipe. It is unimportant whether the openings are placed at a regular, irregular spacing or combination thereof. As described hereinabove, permeable sock 501 can be closed over a drain pipe 502 using any suitable means, such as, for example, a Velcro closure at a seam 18.

Drain pipe suitable for borehole installation covered by a fluid permeable sock provides significant advantages over drain pipe installations of the prior art. Drain pipe suitable for borehole installation, such as, for example, perforated HDPE pipe, is far more robust than the relatively thin walled perforated drain pipe of the prior art.

Also, in the prior art, the more robust HDPE pipe was used only temporarily to protect a relatively fragile drain pipe structure during installation of the relatively fragile drain pipe. Then, post-installation, the protective HDPE pipe had to be removed. According to the new system and method described herein, the more robust drain pipe (e.g. HDPE pipe) as provided with openings and/or holes becomes the permanently installed drain pipe which is further protected by the permanently installed permeable protective sock. In typical installations, both the drain pipe and the permeable protective sock are permanently and simultaneously installed in an underground opening or hole (e.g. pulled into a borehole). There is no longer any need for the temporary protective outer pipe of the prior art, which must be removed post-installation.

The fluid permeable sock offers a number of advantages over the prior art techniques for installing drain pipe. Particularly in hazardous environments, such sock materials as described hereinabove, however, now woven to be intentionally fluid permeable and provided without water proof coating, are still resistant to deterioration by chemical exposure. The materials are also strong and can protect the drain pipe before, during, and after the installation of the drain pipe. In most cases, the protection will last for the service life of the drain pipe. Also, as before, and for all of the aforementioned reasons, a drain pipe can also in some installations remain slidingly engaged or somewhat slidingly engaged, even with an intentionally permeable sock. Thus, it can be seen that horizontal directional drilling can now be more efficiently used to install a drain pipe (e.g. perforated drainage pipe) using such permeable sock materials as permeable woven ultra-high molecular weight polyethylene or trampoline fabrics (not coated) so that the protective sock sleeve is water permeable and further can act as a filter to keep sediment and/or rocks and other debris from migrating into the protected drain pipe.

While the present invention has been particularly shown and described with reference to the preferred mode as illustrated in the drawing, it will be understood by one skilled in the art that various changes in detail may be affected therein without departing from the spirit and scope of the invention as defined by the claims. Moreover, where various embodiments may have been described with particular reference to use with respect to directional drilling, persons of ordinary skill in the art would understand that such embodiments would be substantially analogous to use with respect to host pipe insertion, and vice versa.

In addition to directional drilling and host pipe insertion discussed above, the techniques described hereinbelow are also applicable to auger boring, pipe ramming, static plowing, and any combinations thereof.

During development of the sock described in METHOD AND APPARATUS FOR PROTECTING PIPE INSTALLED UNDERGROUND AFTER HORIZONTAL DRILLING as cited hereinabove, it was realized that such damage near the coupler is often caused by an angular deflection of the pipe near the installation apparatus connection to the pipe being inserted into the borehole (e.g. near a pull head). The reason for the angular deflection near the end of the pipe being inserted into the borehole is believed to be buoyancy of an air filled pipe in any water and/or drilling slurry fluid in the borehole. Once the problem of pipe buoyancy was understood, a new method of placing the coupler apparatus some distance from the end of the pipe was developed. In further testing, the coupler was typically placed more than about six inches, preferably about two feet or more back from the end of the pipe being pulled into a borehole by an installation apparatus. Since the method was improved, there have no further instances of damage to either the sock or one or more tracer wires being simultaneously pulled into a borehole. Effective distances for the coupler from the end of the pipe can range from about half a foot (six inches) to several feet depending on the type of pipe, the diameter of the pipe and the conditions in the borehole. For example, for poly pipes of about two or three inches in diameter, about a two feet distance between the end of a pipe and the coupler apparatus has been found to substantially eliminate any damage to any item being carried by a coupler.

What is claimed is:

1. A perforated drain pipe protection apparatus in combination with a perforated drain pipe comprising:
    a perforated drain pipe having a plurality of perforations;
    a sheet of fluid permeable material woven from a plurality of high strength yarns having an inner surface and an outer surface and a longitudinal direction and a width direction defined by two edges of said sheet along said longitudinal direction;
    a fastening structure configured to join said two edges to form a seam as said sheet of permeable material is wrapped in said width direction around a perforated drain pipe to be installed underground to form a protective sock cover along said longitudinal direction, said sock configured to be installed underground with said perforated drain pipe about which it is wrapped;
    a coupler comprising a first coupler half and a second coupler half, both halves comprising a leading edge to stabilize a soil matrix as said pipe and said protective sock cover are inserted into a borehole, and at least one slot disposed in an outer surface to allow a fluid to pass by said coupler as said coupler is pulled through said borehole;
    a plurality of bolts to join said first coupler half to said second coupler half about said pipe and said protective sock cover, wherein said coupler formed by said first coupler half joined to said second coupler captures said protective sock cover at a location on said pipe at a distance of greater than about six inches from a first end of the pipe which is to be mechanically coupled to an installation apparatus to install the pipe and protective sock cover into the borehole, and wherein the installation apparatus is not directly coupled to said coupler for the installation of said pipe with said protective sock cover into said borehole; and
    wherein said protective sock cover acts as a fluid permeable filter which keeps debris including sediment or rocks from migrating into said perforated drain pipe while allowing fluid to drain from said perforated drain pipe through said plurality of perforations both during installation, and during a service life of said perforated drain pipe and said sock.

2. The drain pipe protection apparatus of claim 1, wherein said drain pipe protection apparatus is configured to be installed into a borehole formed by a method selected from the group consisting of directional drilling, auger boring, pipe ramming, static plowing, and combinations thereof.

3. The drain pipe protection apparatus of claim 1, wherein said pipe protection apparatus is configured to be inserted into a host drain pipe.

4. The drain pipe protection apparatus of claim 1, wherein said sheet of permeable material comprises a long chain polyethylene.

5. The drain pipe protection apparatus of claim 1, wherein said sheet of permeable material comprises an ultra-high density polyethylene.

6. The drain pipe protection apparatus of claim 1, wherein said sheet of permeable material comprises an aramid.

7. The drain pipe protection apparatus of claim 1, wherein said sheet of permeable material comprises a liquid crystal polymer.

8. The drain pipe protection apparatus of claim 1, wherein said sheet of permeable material comprises a combination of one or more materials selected from the group consisting of a long chain polyethylene, an ultra-high density polyethylene, an aramid, and a liquid crystal polymer.

9. The drain pipe protection apparatus of claim 1, wherein said sheet of permeable material comprises a woven polypropylene loaded with carbon.

10. The drain pipe protection apparatus of claim 1, wherein said fastening structure comprises a hook-and-loop fastener.

11. The drain pipe protection apparatus of claim 1, wherein said fastening structure comprises a zipper.

12. The drain pipe protection apparatus of claim 1, wherein said permeable material comprises a high strength yarn.

13. The drain pipe protection apparatus of claim 1, wherein said permeable material comprises a yarn formed from fibers having a tensile modulus equal to or greater than 150 grams/denier.

14. The drain pipe protection apparatus of claim 1, further comprising a tracer wire.

15. The drain pipe protection apparatus of claim 14, wherein said tracer wire is disposed within said fastener structure.

16. A method for protecting a drain pipe before, during and after installation, comprising the steps of:
providing a perforated drain pipe having a plurality of perforations and a sheet of permeable sock fabric comprising a sheet of fluid permeable material woven from a plurality of high strength yarns having an inner surface and an outer surface and a longitudinal direction and a width direction defined by two edges of said sheet along said longitudinal direction, a fastening structure configured to join said two edges to form a seam as said sheet of permeable material is wrapped in said width direction around a perforated drain pipe configured to be installed underground to form a protective sock cover along said longitudinal direction, and a clamp comprising a first coupler half and a second coupler half, both halves comprising a leading edge to stabilize a soil matrix as said pipe and said protective sock cover are inserted into a borehole, and at least one slot disposed in an outer surface to allow a fluid to pass by said coupler as said coupler is pulled through said borehole, a plurality of bolts to join said first coupler half to said second coupler half about said pipe and said protective sock cover, wherein said coupler formed by said first coupler half joined to said second coupler captures said protective sock cover at a location on said pipe at a distance of greater than about six inches from a first end of the pipe which is to be mechanically coupled to an installation apparatus to install the pipe and protective sock cover into the borehole, and wherein the installation apparatus is not directly coupled to said coupler for the installation of said pipe with said protective sock cover into said borehole, said sock configured to be installed underground with said perforated drain pipe about which it is wrapped, and wherein said protective sock cover acts as a fluid permeable filter which keeps debris including sediment or rocks from migrating into said perforated drain pipe while allowing fluid to drain from said perforated drain pipe through said plurality of perforations both during installation, and during a service life of said perforated drain pipe and said sock;
installing said sheet of permeable sock fabric around said pipe by the steps of:
placing said sheet of permeable sock fabric adjacent said drain pipe;
wrapping said sheet of permeable sock fabric around said drain pipe;
securing said sheet to itself along a seam to form a permeable sock-covered drain pipe;
clamping said permeable sock to said pipe with said clamp; and
installing said permeable sock-covered drain pipe underground.

17. The method for protecting drain pipe of claim 16 wherein the step of installing said permeable sock-covered pipe underground further comprises inserting said permeable sock-covered pipe into a borehole.

18. The method for protecting drain pipe of claim 17, wherein the borehole is formed by a method selected from the group consisting of directional drilling, auger boring, pipe ramming, static plowing, and combinations thereof.

19. The method for protecting drain pipe of claim 18, wherein the step of installing said permeable sock-covered drain pipe underground further comprises inserting said permeable sock-covered drain pipe into a host drain pipe.

20. The method for protecting drain pipe of claim 16, wherein said step of providing said sheet of permeable sock fabric comprises providing a roll of said sheet of permeable sock fabric.

21. The method for protecting drain pipe of claim 20, wherein said step of providing said sheet of permeable sock fabric comprises providing said sheet of permeable sock fabric comprising a material selected from the group consisting of a long chain polyethylene, an ultra-high density polyethylene, an aramid, a liquid crystal polymer, and combinations thereof.

* * * * *